April 10, 1928.  L. SIMON  1,665,679
LIGHT SCREEN AND VENTILATOR
Filed Jan. 22, 1926   3 Sheets-Sheet 2
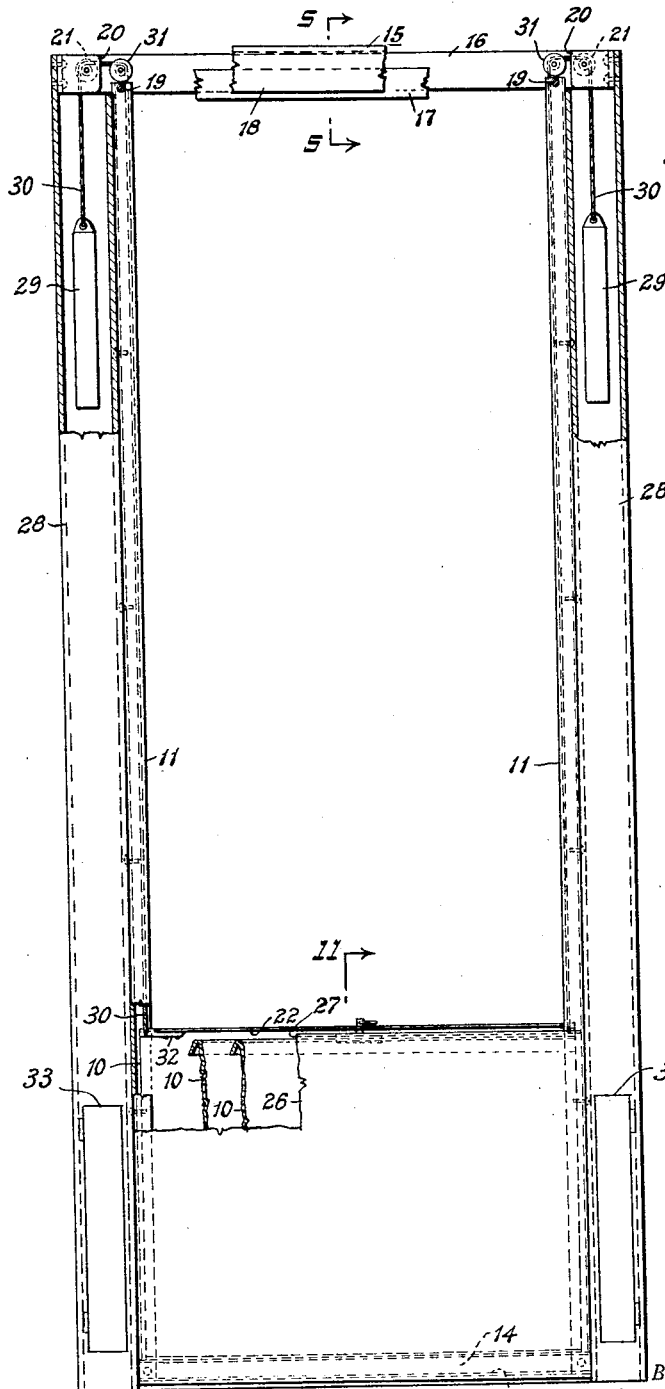
INVENTOR.
Leopold Simon
BY Duell, Anderson & Duell
ATTORNEYS.

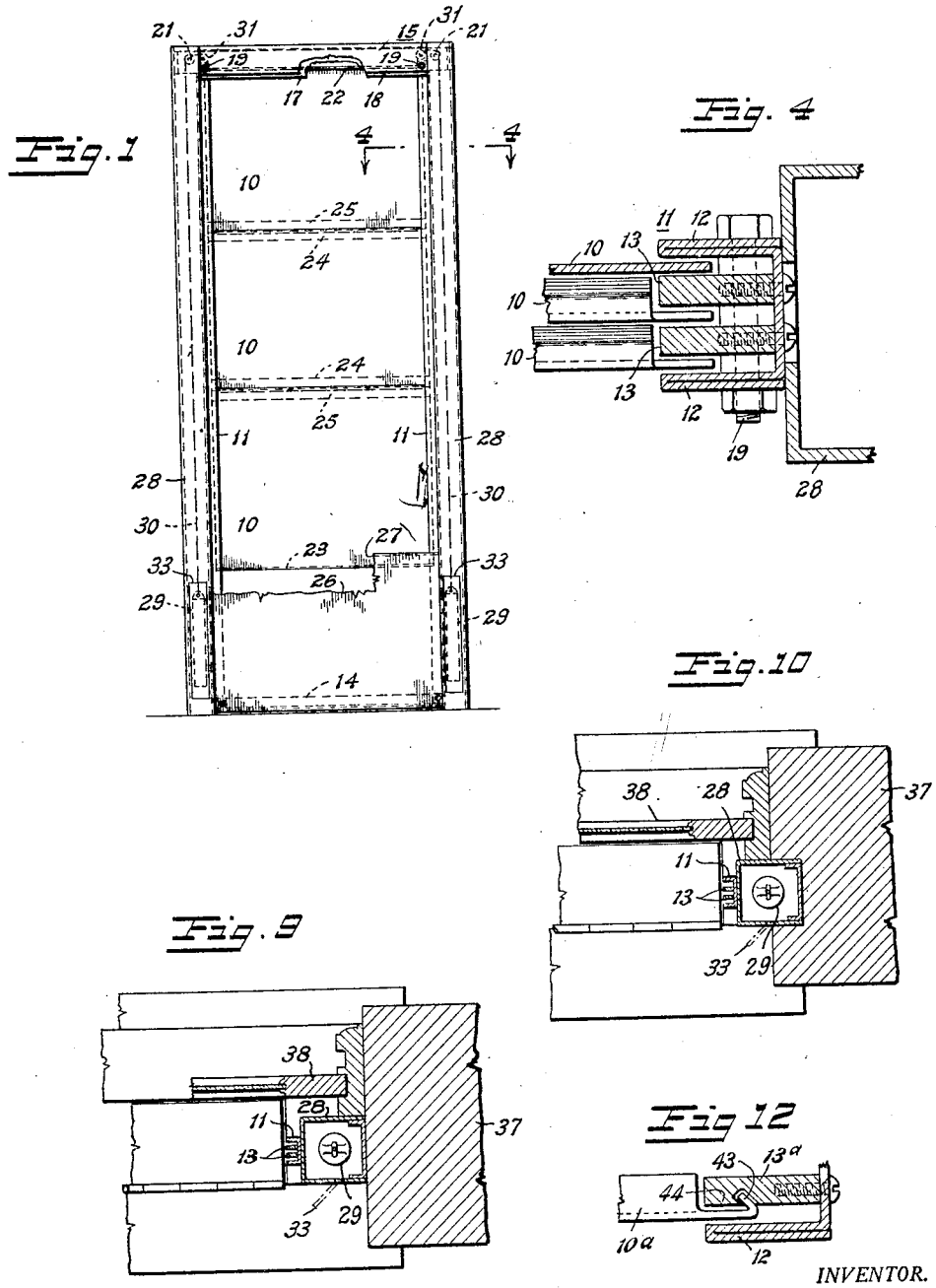
April 10, 1928.
L. SIMON
LIGHT SCREEN AND VENTILATOR
Filed Jan. 22, 1926
3 Sheets-Sheet 1
1,665,679

April 10, 1928.

L. SIMON 1,665,679

LIGHT SCREEN AND VENTILATOR

Filed Jan. 22, 1926

INVENTOR.
Leopold Simon
BY
Duell, Anderson & Duell
ATTORNEYS.

Patented Apr. 10, 1928.

1,665,679

UNITED STATES PATENT OFFICE.

LEOPOLD SIMON, OF NEW YORK, N. Y.

LIGHT SCREEN AND VENTILATOR.

Application filed January 22, 1926. Serial No. 82,948.

This invention relates to improvements in movable closure devices or coverings for openings, and more particularly in some of its details it relates to improvements in adjustable light screens or ventilators which may be employed in connection with windows or other openings leading to buildings or other enclosures.

It is a general object of the invention to provide an improved closure device of simple and durable construction, susceptible of easy installation and operation, and being relatively inexpensive in production costs.

It is a further object of the invention to provide a screen or like covering or closure embodying an improved construction and arrangement whereby the screen may be readily extended into operative position over an opening or collapsed into a housing provided therefor adjacent the opening.

A further object is to provide an improved sectional collapsible and extensible screen or shutter having improved interlocking formations between adjacent sections or louvers cooperating to effectively couple the sections together as the shutter is extended and to provide light tight and moisture tight joints between adjacent sections.

Still another object is to provide a sectional, collapsible and extensible screen or shutter with improved guideways for slidably mounting the shutter sections or louvers and to provide improved connections between adjacent louvers whereby to exclude passage of direct light rays through and beyond the plane of the screen.

Another object of the invention is to provide, in a closure or shutter device of the class mentioned, an improved assembly of structural elements whereby a durable effective and satisfactory shutter device is provided which is capable of easy installation in buildings or the like of new or old existing constructions.

Other objects of the invention will be in part pointed out in connection with the following detailed description of certain preferred but illustrative embodiments of the invention, and will be in part obvious in connection therewith.

The invention accordingly comprises the features of construction, combinations of elements, and arrangement of parts, which will be exemplified in the construction hereinafter set forth and the scope of the application of which will be indicated in the claims.

For a more complete understanding of the nature and objects of the invention, reference is had to the following detailed description of illustrative embodiments of the invention and to the accompanying drawing, in which Figure 1 is a front elevation of a shutter or screen construction embodying the invention and including a supporting frame and guideways disassociated from a building construction, the shutter being shown in closed or operative position;

Fig. 2 is an enlarged elevation similar to Fig. 1, the shutter being shown in collapsed or inoperative position, and parts being broken away for clearness of disclosure;

Fig. 3 is a fragmentary enlarged vertical section through shutter sections or louvers showing the interlocking formations of the adjacent louvers;

Fig. 4 is a fragmentary enlarged section approximately on the line 4—4 of Fig. 1;

Figs. 9 and 10 show two different arrangements for installing the improved screen or shutter device adjacent to a window construction of buildings or the like.

Fig. 12 is a view similar to Fig. 4 showing a modified construction.

Figure 5:
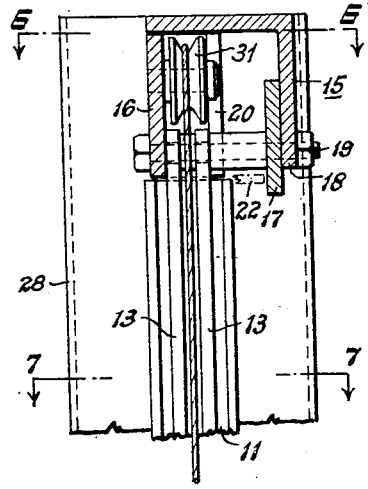
Fig. 5 is an enlarged vertical sectional elevation taken approximately on the line 5—5 of Fig. 2.
Figure 6:
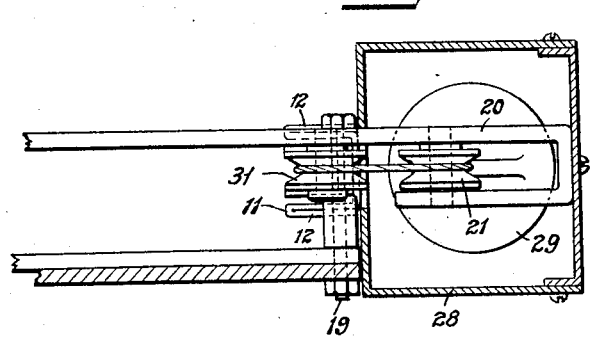
Fig. 6 is an enlarged sectional plan taken approximately on the line 6—6 of Fig. 5.
Figure 7:
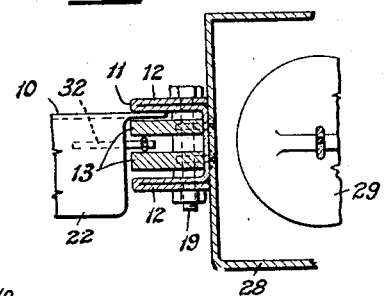
Fig. 7 is a sectional plan taken approximately on the line 7—7 of Fig. 5 showing a plan of the leading louver and the method of attachment of an operating cord thereto.

Referring to the drawing for a detailed description of the illustrative embodiments of the invention there shown, and first to Figs. 1 to 7 inclusive, it will be seen that a plurality of louvers or panels 10 are provided supported by a structural framework. These panels or sections cooperate with each other to provide a complete sectional screen or shutter which may be utilized for covering an opening, such as a window or other opening of the wall of a building. These louvers or panels may vary in construction in practice and may be reticulated or imperforate according to the use to which they are to be employed. The panels shown are of sheet material such as sheet metal and are imperforate so as to prevent passage of light rays, air, dust, moisture, etc. There may be as many of these louvers as desired to cover an opening, three being shown in the illustrative embodiments of the drawing, and their size may vary according to requirements.

For supporting the louvers for movement to and from position for closing the opening, a structural frame is provided including channel guide members 11 having inwardly directed spaced flanges 12 which are preferably reinforced by turning the metal of the flanges back upon itself as shown in Fig. 4. In order to provide separate channels or guideways for the reception of the edges of the louvers, guide strips 13 may be detachably secured, in spaced relation with each other and with the channel flanges, to the guide members as by means of screws as shown. A transverse frame member in the form of a channel bar 14 with upwardly directed flanges connects the lower ends of the guide members 11, being preferably directly connected thereto as by means of bolts as shown to provide a transverse lower frame or base member. The guide members 11 are also connected at their upper ends by means of a structural member or lintel 15 also directly connected to the guide members by bolts 19. This direct connection of the guide members provides a structural framework or unit for mounting the louvers which may be preassembled and subsequently installed in operative position or removed, and it may also be transported in this form.

The construction of the lintel 15 as shown includes spaced bars 16, 17 and an angle cap bar 18 having a downwardly extending flange disposed adjacent the bar 17 and a horizontal flange overlying the bar 16. All these bars are secured together and to the guide members 11 as by means of the through bolts 19. The bar 16 is extended at its opposite ends beyond the guide members to form supporting extensions 20 for counter weights referred to hereinafter. These supporting extensions are preferably in the form of loops as shown for effectively supporting the pulleys 21.

Each of the louvers 10 is individually mounted for sliding movement in the channels or grooves formed by the flanges 12 and the intermediate guide strips 13, the edges of the louvers extending into these grooves for this purpose whereby said louvers assume a face to face position in adjacent parallel planes in which they are are respectively slidable. The advance or leading louver 10, that is the one which moves in advance of the others when moving toward closing position, is provided at its leading edge with an angularly disposed flange 22 positioned to span or overlap the edges of the adjacent companion louvers. This flange may therefore contact with the edges of the adjacent louvers to compel them to move into opening or collapsed position. The edge of this flange lies directly behind and in close proximity to the lintel bar 17 (see Figs. 1 and 5) so as to form a substantially light, tight closure at this point, preventing passage to direct light rays from one side of the closure to the other. The lintel bar 16 forms a stop which contacts with the flange 22 of the leading louver to limit closing movement thereof.

Figure 11:
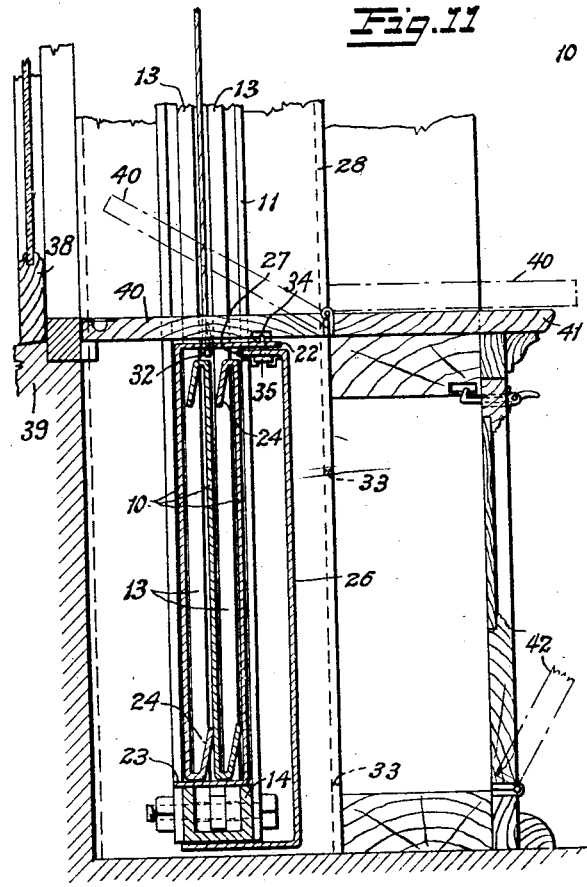
Fig. 11 is a vertical sectional view through a building construction adjacent a window thereof and showing an installation of the improved screen or shutter device.

The last or lowermost louver 10 is preferably provided at its following or lower edge with an angularly disposed flange 23 which spans or overlaps the adjacent companion louvers when the shutter is in collapsed or opening position. This flange contacts with the transverse frame member 14 to provide a support for the companion louvers as shown in Fig. 11. In order that the adjacent louvers may be effectively engaged with each other in cooperating relation to form the complete screen or shutter, interlocking formations are provided which automatically engage with each other when the louvers are in extended or closing position. For this purpose, the leading louver 10 is provided at its trailing lateral edge with a flange 24 turned backwardly along the face of the louver plate and spaced therefrom a short distance, and the last louver plate is provided at its leading edge with a similar flange 24. Both of these flanges face toward the adjacent intermediate louver. Each intermediate louver is also provided at its opposite lateral edges with backwardly turned flanges 25 similar to the flanges 24, and disposed at opposite faces of the louver plate so as to oppose the flanges of the adjacent companion louvers. Each of the flanges 24, 25 constructed and arranged as described provides a pocket for the reception of the companion or cooperating flange of the adjacent louver plate, so that when the shutter is extended the flanges engage in interlocking relationship as seen in Figs. 1, 3, 4 and 5. This interlocking engagement prevents direct passage of light rays through and beyond the plane of the shutter, and the engaging edges of the louvers with the channel guide members 11 and with the lintel 15 provide similar light, tight joints. Similarly passage of direct light rays at the lower edge of the lowermost louver is prevented by the overlapping upper edge of a fixed plate 26 secured to the channel guides 11 and having at its upper edge an inturned flange 27, the edge of which lies in proximity to the face of the lowermost louver.

A tubular post 28 is provided laterally adjacent to each channel guide 11 when the shutter or screen device is installed in operative position. These tubular posts may form part of the building construction or they may be installed as separate elements when the screen is installed, or if preferred, they may be attached to or form a part of the channel guides 11 and attached framework. When the tubular posts 28 with assembled guide-ways 11 are connected together by the lintel 15 and the lower transverse frame member 14 a unitary framework for the screen is provided which may be installed in the window opening or removed therefrom as a unit. These tubular posts are shown in assembled position relatively to the channel guides in Figs. 1, 2 and 4. In order that the posts and guides 11 may be positioned closely adjacent to each other to form light, tight joints, the posts may be provided with apertures for the accommodation of the securing screws as shown in Fig. 4, and the posts are slotted at their upper ends to provide openings for the passage of the extensions 20 of the lintel bar whereby said extensions align or register with the tubular openings of the posts. These posts provide housings for counterbalancing weights 29 which are connected to the leading louver by flexible connections 30 passing over pulleys 21 and over companion pulleys 31. The cords 30 are connected to lugs or extensions 32 connected to the louver flange 22. The posts may be provided with doors as indicated at 33, Fig. 9 for providing access to the weight compartments.

Figure 8:
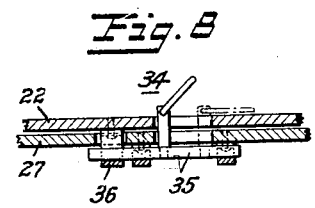
Fig. 8 is a detailed sectional view of a locking device for securing the improved screen in open position.

The counterbalancing weights 29 may be sufficiently heavy to overbalance the entire number of panels when fully extended, so as to retain the shutter in extended or covering position. The weights therefore tend continually to move the shutter device into extended position. For the purpose of holding the shutter in opening position, a latching device 34 is provided, being preferably mounted upon flange 27 of the stationary plate 26. This latch may be of any desired construction, that shown in Fig. 8 including a slidable bolt 35 mounted on the underside of flange 27 to engage a keeper or loop 36 mounted upon the louver flange 22 in position to register with and project through an opening in flange 27 into alignment with the sliding bolt 35. The latch thus secures the shutter device in collapsed or opening position in opposition to the action of the counterbalancing weights 29. Automatic closing under the influence of the weights may be effected by release of the latch. Such latch release, if desired, may be effected from a distance by appropriate operating connections.

A manner of assembly of the improved shutter device adjacent to a window opening of a building or the like is shown in Fig. 9 in which the window post is shown at 37 and the sash at 38. The tubular post 28 is shown as abutting the face of the window post in flush relation therewith. In this manner the louvers of the shutter device are enabled to move in planes parallel and closely adjacent to the plane of the sliding window sash. A similar assembly is shown in Fig. 10 in which the tubular post 28 is set into a groove formed in the face of the window post 37.

A vertical sectional view of an assembly similar to that of Figs. 9 and 10 is shown in Fig. 11 in which the window sash 38 and window sill 39 assume a position adjacent to the shutter device and a housing or pocket is provided into which the louvers disappear when in collapsed or opening position. This housing is shown as being disposed adjacent to and below the level of the window sill 39. A movable cover 40 for this housing is hinged to the sill finishing board 41, the cover 40 and board 41 being disposed substantially at the horizontal level of the sill 39. The lower end of the unitary supporting framework of the louvers, comprising the guiding channels 11 and transverse frame members 14, extends into this housing which is sufficiently deep to receive and completely house the louvers in collapsed position and to permit the cover 40 to be placed into closing position as shown. In order to provide access to the housing and to the tubular weight posts 28 and to operative parts of the device, an inner panel 42 may be hinged so as to swing to open position.

From the foregoing disclosure, it will be seen that the interengaging louvers, slidably mounted as described, provide a simple, durable and efficient arrangement utilizable for various purposes such as for shutters, screens, ventilators or other closure devices. The joints between the adjacent panels and between said panels and guide channels, being arranged to prevent passage of direct light rays, the device is well adapted for utilization as a screen or shutter to darken rooms or to prevent escape of light therefrom. It may also be utilized to prevent passage of dust or moisture, as a screen to exclude insects, and for like purposes. Since the adjacent panels 10 are overlapped or shingled onto each other and connected at the overlapping edges by means of the inner locking joints, moisture trickling from above on the outside will be effectively shed and prevented from penetrating through the shutter. Due to this shedding function, the device may be employed in an inclined position as upon an inclined roof. It may also be utilized as a closure or screen for skylights or other upwardly directed openings. Other uses will readily suggest themselves to those skilled in the art.

Instead of mounting the louvers for vertical movement as illustrated, the guide members 11 may be positioned horizontally so that the louvers move horizontally to closing or opening positions, or they may be mounted in other positions made desirable by varying circumstances. Also the louver housing chamber may be positioned above the opening to be covered, in which case the louvers are moved downwardly to covering position instead of moving upwardly. When mounted in the position shown, or in any of the other positions, the louvers may be operated by other means than by the counterweights, as by power or by hand operating mechanism.

As shown in Fig. 12, the longitudinal edges of the louvers and the guide members 11 may be formed so as to provide a tighter joint and a more positive sliding engagement. In such case, each louver 10ª may be formed with an edge flange 43 which is turned back at its longitudinal edge to provide for interlocking engagement with the adjacent guide strip 13ª which for this purpose may be provided at its inner adjacent longitudinal edge with a complementary formation or flange 44, forming an underlying groove for the reception of the flange 43. The flanges 43 and 44 thus slidably engage or interlock with each other to provide tighter and stronger sliding connections between the louvers and the guide members 11, thus effecting more efficient exclusion of light, dust, moisture, etc.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention what I claim as new and desire to secure by Letters Patent, is:

1. A screen or covering device for application to windows, or like openings, including, in combination, spaced tubular posts, cross frame members extending between said posts, and including an upper lintel member and a lower base member, said posts and frame members forming a unitary screen framework adapted for installation as a unit within a window opening, guide members upon the inner faces of the said tubular posts and having channel guide-ways, a plurality of louvers mounted face to face in said channel guide-ways for sliding movement relatively to each other, the mutually adjacent louvers having flanges disposed at the leading edge of one and at the following edge of the other and turned backwardly from the edges along the adjacent faces thereof and facing toward each other so as to engage in interlocking relation when the louvers are moved relatively to each other into extended position, counterweight mechanism for operating said louvers and including a weight housed wholly within one of said tubular posts and running therein, and a flexible connection between said weight and one of the louvers.

2. A screen or covering device for application to windows, or like openings, including, in combination, spaced tubular posts, cross frame members extending between said posts, and including an upper lintel member and a lower base member, said posts and frame members forming a unitary screen framework adapted for installation as a unit within a window opening, guide members upon the inner faces of the said tubular posts and having channel guide-ways, a plurality of louvers mounted face to face in said channel guide-ways for sliding movement relatively to each other, the mutually adjacent louvers having flanges disposed at the leading edge of one and at the following edge of the other and turned backwardly from the edges along the adjacent faces thereof and facing toward each other so as to engage in interlocking relation when the louvers are moved relatively to each other into extended position, the leading louver having at its leading edge a flange disposed to overlie the adjacent companion louvers and providing an attachment for operating mechanism, and the last following louver having at its trailing edge a flange disposed to underlie the adjacent companion louvers and to support the latter when in collapsed position, said last mentioned flange being positioned to be supported upon said lower or base member, counterweight mechanism for operating said louvers and including a weight housed wholly within one of said tubular posts and running thereon, and a flexible connection between said weight and one of the louvers.

3. A screen or covering device for application to windows, or like openings, including, in combination, spaced tubular posts, cross frame members extending between said posts, and including an upper lintel member and a lower base member, said posts and frame members forming a unitary screen framework adapted for installation as a unit within a window opening, guide members upon the inner faces of the said tubular posts and having channel guide-ways, and a plurality of louvers mounted face to face in said channel guide-ways for sliding movement relatively to each other, the mutually adjacent louvers having flanges disposed at the leading edge of one and at the following edge of the other and turned backwardly from the edges along the adjacent faces thereof and facing toward each other so as to engage in interlocking relation when the louvers are moved relatively to each other into extended position, said lintel including a member extended at opposite ends into longitudinal alignment with said tubular posts to provide supports for louver operating cords.

4. A screen or covering device for application to windows, or the like openings, including, in combination, spaced tubular posts, cross frame members extending between said posts, and including an upper lintel member and a lower base member, said posts and frame members forming a unitary screen framework adapted for installation as a unit within a window opening, guide members upon the inner faces of the said tubular posts and having channel guide-ways, and a plurality of louvers mounted face to face in said channel guide-ways for sliding movement relatively to each other, the mutually adjacent louvers having flanges disposed at the leading edge of one and at the following edge of the other and turned backwardly from the edges along the adjacent faces thereof and facing toward each other so as to engage in interlocking relation when the louvers are moved relatively to each other into extended position, the leading louver having at its leading edge a flange disposed to overlie the adjacent companion louvers and providing an attachment for operating mechanism, and the last following louver having at its trailing edge a flange disposed to underlie the adjacent companion louvers and to support the latter when in collapsed position, said last mentioned flange being positioned to be supported upon said lower or base member, said lintel including a member extended at opposite ends into longitudinal alignment with said tubular posts to provide supports for louver operating cords.

5. A screen or covering device for application to windows or like openings, including, in combination, spaced tubular posts, cross frame members extending between said posts, and including an upper lintel member and a lower or base member, said posts and frame members forming a unitary screen framework adapted for installation as a unit within a window opening, guide members including channel bars attached to the inner faces of said tubular posts and each having inwardly extending flanges and one or more guide strips attached to the web of the channel bar and cooperating with the flanges to provide individual guiding grooves, and a plurality of louvers mounted individually face to face in said guiding grooves for sliding movement relatively to each other, the mutually adjacent louvers having interlocking formations respectively at the leading and following edges thereof so as to engage in interlocking relation when the louvers are moved relatively to each other into extended position.

6. In a device of the character described, in combination, a window casing, a housing adjacent said casing at its lower end, spaced tubular posts, cross frame members extending between and connecting said posts and including a lower or base member at the lower ends of the posts and an upper lintel member, said base member and the lower ends of said posts being positioned within said housing, guide members secured upon the inner faces of the posts and each having a plurality of spaced parallel guiding grooves or channels therein and extending into said housing, a plurality of louvers mounted face to face in said guiding grooves for sliding movement relatively to each other, the mutually adjacent louvers having flanges disposed at the leading edge of one and at the following edge of the other and each extending over the adjacent guiding groove for mutual interlocking engagement with each other when the louvers are moved relatively to each other into extended position, each of said louvers being individually mounted in said guiding grooves and slidable therein in adjacent planes into collapsed position entirely within said housing, counterweight mechanism for operating said louvers and including a weight housed wholly within one of said tubular posts and running thereon, and a flexible connection between said weight and one of the louvers.

7. In a device of the character described, in combination, a guideway for a plurality of adjacent movable panels, including a metallic channel having one or more guiding strips detachably secured in position between the channel flanges so as to provide a plurality of adjacent guiding channels, movable panels slidably mounted face to face in said guiding channels and having flanges disposed respectively at their leading and following edges so as to engage in interlocking relation when the louvers are relatively extended, and extending transversely of said guiding channels and flanges at the longitudinal edges of said movable panels cooperating to form tight joints respectively with said guiding strips.

8. In a device of the character described, in combination, a panel guideway including a pair of spaced guide members each having a plurality of adjacent longitudinal guiding channels or grooves, spaced transverse frame members extending between and secured directly to said guide members, a tubular member positioned adjacent each of said guide members and one of said transverse frame members having extensions projecting into said tubular members to provide supports for counterbalancing weights.

9. In a device of the character described, in combination, a window casing, a housing adjacent said casing at its lower end, spaced tubular posts, cross frame members extending between and connecting said posts and including a lower or base member at the lower ends of the posts and an upper lintel member, said base member and the lower ends of said posts being positioned within said housing, guide members secured upon the inner faces of the posts and each having a plurality of spaced parallel guiding grooves or channels therein and extending into said housing, a plurality of louvers mounted face to face in said guiding grooves for sliding movement relatively to each other, the mutually adjacent louvers having flanges disposed at the leading edge of one and at the following edge of the other and each extending over the adjacent guiding groove for mutual interlocking engagement with each other when the louvers are moved relatively to each other into extended position, each of said louvers being individually mounted in said guiding grooves and slidable therein in adjacent planes into collapsed position entirely within said housing, guiding pulleys supported by one of said cross frame members in alignment with said tubular posts, and operating mechanism for said louvers, including operating cords attached to the leading louver and extending therefrom over said guiding pulleys into said tubular posts.

10. In a device of the character described, in combination, a window casing, a housing adjacent said casing at its lower end, spaced tubular posts, cross frame members extending between and connecting said posts and including a lower or base member at the lower ends of said posts, and an upper lintel member including an angle bar with a dependent flange, said base member and the lower ends of said posts being positioned within said housing, guide members secured upon the inner faces of the posts and each having a plurality of spaced parallel guiding grooves or channels therein and extending into said housing, a plurality of louvers mounted face to face in said guiding grooves for sliding movement relatively to each other, the mutually adjacent louvers having flanges disposed at the leading edge of one and at the following edge of the other and each extending over the adjacent guiding groove for mutual interlocking engagement with each other when the louvers are moved relatively to each other into extended position, each of said louvers being individually mounted in said guiding grooves and slidable therein in adjaceint planes into collapsed position entirely within said housing, and a marginal flange at the leading edge of the leading louver overlying the other louvers when collapsed and having its outer edge lying in proximity to said dependent lintel flange so as to provide a light tight joint when the louvers are extended.

11. A screen or covering device for application to windows, or like openings, including, in combination, spaced tubular posts, cross frame members extending between said posts, and including an upper lintel member and a lower base member, said posts and frame members forming a unitary screen framework adapted for installation as a unit within a window opening, guide members upon the inner faces of the said tubular posts and having channel guideways, a plurality of louvers mounted face to face in said channel guideways for sliding movement relatively to each other, the mutually adjacent louvers having flanges disposed at the leading edge of one and at the following edge of the other and turned backwardly from the edges along the adjacent faces thereof and facing toward each other so as to engage in interlocking relation when the louvers are moved relatively to each other into extended position, counterweight mechanism for operating said louvers and including a weight housed wholly within one of said tubular posts and running thereon, a flexible connection between said weight and one of the louvers, and a fixed plate secured to said unitary framework and having an interned flange cooperating with one of said louvers in extended position to form therewith a tight joint.

12. A screen or covering device for application to windows, or like openings, including, in combination, spaced tubular posts, cross frame members extending between said posts, and including an upper lintel member and a lower base member, said posts and frame members forming a unitary screen framework adapted for installation as a unit within a window opening, guide members upon the inner faces of the said tubular posts and having channel guide-ways, a plurality of louvers mounted face to face in said channel guide-ways for sliding movement relatively to each other, the mutually adjacent louvers having flanges disposed at the leading edge of one and at the following edge of the other and turned backwardly from the edges along the adjacent faces thereof and facing toward each other so as to engage in interlocking relation when the louvers are moved relatively to each other into extended position, counterweight mechanism for operating said louvers and including a weight housed wholly within one of said tubular posts and running thereon, a flexible connection between said weight and one of the louvers, a fixed plate secured to said unitary framework and having an interned flange cooperating with one of said louvers in extended position to form therewith a tight joint, and a marginal flange on one louver overlapping the edges of the adjacent louvers when in collapsed position and cooperating with said fixed plate to secure the louvers in collapsed position.

In testimony whereof I affix my signature.

LEOPOLD SIMON.